Patented Sept. 7, 1926.

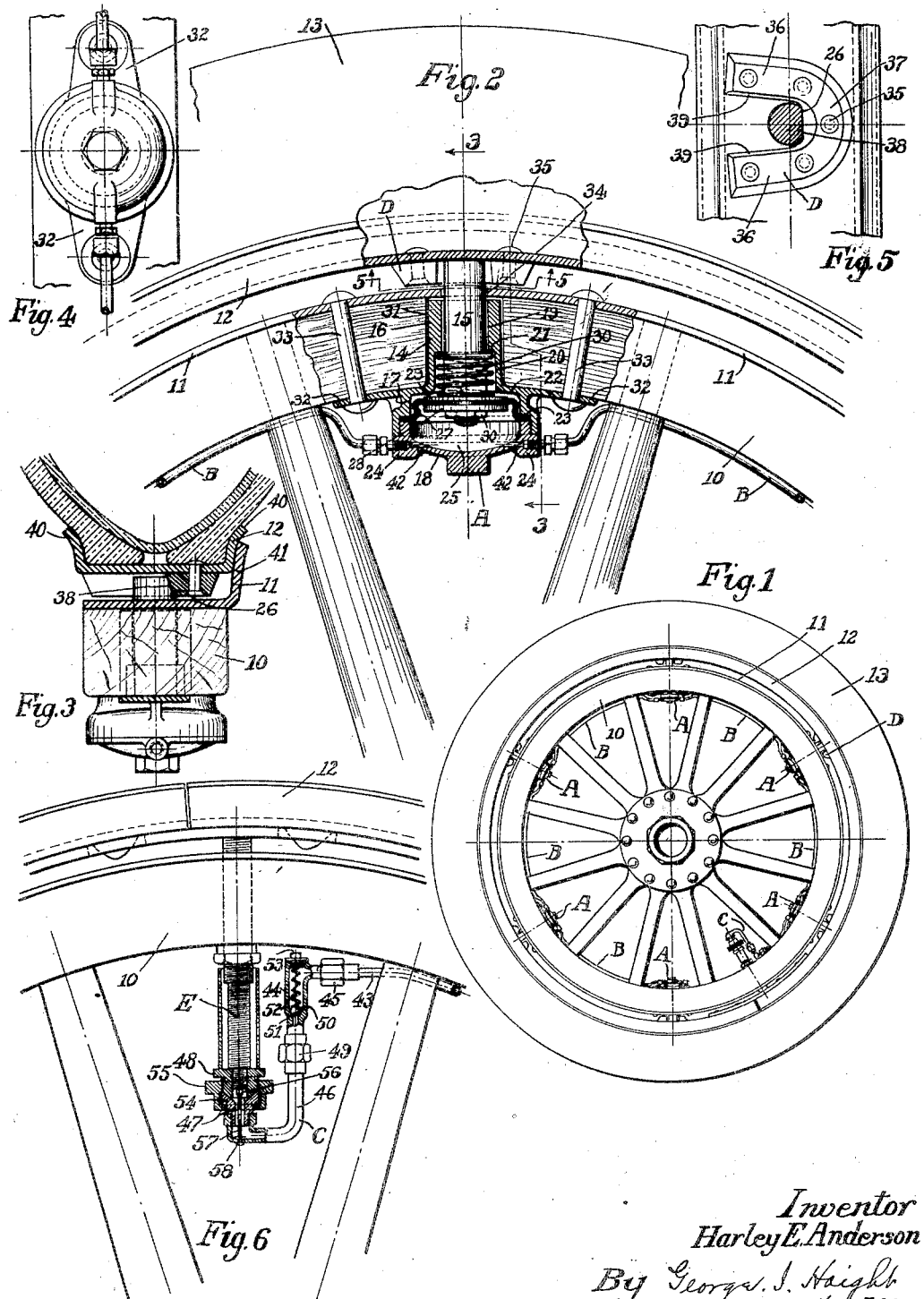

1,598,596

UNITED STATES PATENT OFFICE.

HARLEY E. ANDERSON, OF CHICAGO, ILLINOIS.

DEMOUNTABLE-RIM MECHANISM.

Application filed April 2, 1923. Serial No. 629,498.

This invention relates to improvements in demountable rim mechanism.

One object of the invention is to provide a demountable rim mechanism especially adapted for automobile wheels, wherein simple, efficient and reliable means is provided for effectively holding the demountable rim in place on the rim of the wheel, which may be instantaneously operated to effect dis-engagement thereof with the demountable rim, to permit quick removal of the latter.

A further object of the invention is to provide a mechanism of the character indicated, wherein a plurality of elements are provided for holding and clamping the demountable rim in place, together with means for simultaneously bringing the same into clamping or releasing relation with reference to the demountable rim.

A still further object of the invention is to provide a mechanism of the character indicated, wherein the same amount of force is applied to each of the clamping elements for holding the demountable rim in place.

Another object of the invention is to provide a demountable rim clamping mechanism, wherein the clamping force applied to the rim is equally distributed at spaced points on the rim, and is balanced at all times during the clamping action.

Another object of the invention is to provide a mechanism for detachably holding a demountable rim in fixed position on a wheel by a plurality of elements, operated by a single actuating means to bring the same into locking engagement with and disengage the same from the demountable rim.

Another object of the invention is to provide a demountable rim clamping mechanism, wherein the clamping means proper is fluid operated.

A more specific object of the invention is to provide a demountable rim clamping mechanism, comprising a plurality of wedge acting plungers co-acting with wedge faces on the detachable rim, wherein the plungers are simultaneously actuated by inter-communicating fluid pressure-operated means, supplied from a single source of fluid pressure.

Other objects and advantages of the invention will more clearly appear from the description and claims hereinafter following.

In the drawing forming a part of this specification, Fig. 1 is a side elevational view of a wheel with a demountable rim and tire thereon, showing my improvements in connection therewith. Fig. 2 is an enlarged side elevational view of a portion of the wheel illustrated in Fig. 1, showing one of the clamping devices and the adjacent parts of the wheel and rim in vertical section. Fig. 3 is a transverse vertical sectional view, corresponding substantially to the line 3—3 of Fig. 2. Fig. 4 is a detail plan view of one of the clamping devices, looking upwardly in Fig. 2. Fig. 5 is a horizontal, transverse sectional view corresponding substantially to the line 5—5 of Fig. 2. And Fig. 6 is an enlarged side elevational view of that portion of the wheel illustrated in Fig. 1, through which the tire valve stem passes, certain parts of the air connection being shown in section.

In said drawing, 10 indicates the felly of the wheel, 11 the fixed rim, 12 the demountable rim, 13 the tire and E the tire valve.

My improved demountable rim clamping mechanism comprises, broadly, a plurality of fluid pressure-operated clamping devices proper A, mounted on the wheel; a plurality of connections B for establishing communication between said clamping devices; a connection C for establishing comunication between the air valve of the tire and one of said fluid-pressure operated clamping devices; and a plurality of abutment members D rigidly secured to the demountable rim and adapted to co-act with the clamping devices.

In Fig. 1 of the drawing, the wheel is shown as provided with six clamping devices A co-acting with an equal number of abutment devices on the demountable rim, but it will be understood that any number of clamping devices and co-acting abutments which will effectively hold the rim in place may be used.

Each of the fluid pressure operated clamping devices A comprises a cylinder 14 and a fluid pressure controlled plunger 15 working in the cylinder. Each cylinder 14 comprises a portion 16 of uniform external diameter, and an enlarged end portion 17 closed by a cylindrical head 18. The portion 16 of the cylinder is provided with an axial bore 19 adapted to loosely receive the plunger 15 for sliding movement. The bore 19 is enlarged at the end nearest the enlarged portion 17 of the cylinder, as indicated at 20, thereby providing an annular shoulder 21, for a purpose hereinafter described. The enlarged portion 17 of the cylinder is of greater internal diameter than the diameter of the portion 20 of the bore 19, thereby providing a relatively wide, transversely extending, annular shoulder 22. At its inner end the wall of the enlarged portion 17 is slightly offset laterally, thereby providing a relatively narrow annular interior shoulder 23 approximately midway between the outer and inner end of said enlarged portion 17. The cylindrical head 18 is provided with an externally threaded cylindrical flange 24 projecting from one side thereof, by which the head is secured to the cylinder, the threads of the flange engaging with corresponding interior threads on the offset wall portion of the cylinder. As clearly shown in Fig. 2 the internal diameter of the flange 24 corresponds to the internal diameter of the enlarged portion 17 in the cylinder and the space enclosed by the cylinder head and the enlarged portion 17 of the cylinder constitutes a chamber 25 adapted to receive the motive fluid. To provide means by which the cylinder head may be turned to effect the tightening and removal thereof the same is provided at its outer side with a central hexagonal projection adapted to be engaged by a tool, such as a wrench.

The plungers 15 are slidably mounted for reciprocation in the cylinders 14, and each plunger is provided with a wedge face 26 at the outer end thereof, for a purpose hereinafter described. Attached to the inner end of each plunger 15 is a diaphragm 27, clamped between a pair of discs or washers 28 and 29 on the reduced end of the plunger, the washers and diaphragm being tightly held in clamped position by a nut 30'. As clearly shown in Fig. 2, the diaphragm 27 is located within the chamber 25, and the periphery thereof is tightly clamped between the end face of the flange 24 of the cylinder head and the annular shoulder 23. The diaphragm 27 is adapted to be actuated by fluid pressure to effect movement of the plunger 15 outwardly of the cylinder. The diaphragm may be formed of any suitable material which has the desired flexibility, but is preferably made of rawhide or rubber. A coiled spring 30 surrounding the plunger 15 is interposed between the disc 29 and the annular shoulder 21, and forces the plunger inwardly of the cylinder when the actuating pressure is removed from the opposite side of the diaphragm 27.

The felly 10 of the wheel is provided with a plurality of radially arranged, equally spaced cylindrical openings 31 corresponding in number to the number of clamping devices, each adapted to receive the portion 16 of a cylinder 14, the cylinder being held in fixed position on the felly by means of a pair of lugs 32 oppositely extending from the enlarged portion 17 of the cylinder and secured by rivets 33 passing through the felly 10 and the fixed rim 11 of the wheel. The fixed rim 11 is provided with a plurality of perforations 34, each in axial alinement with an opening 31 of the felly, and of a size to loosely accommodate the plungers 15 projecting therethrough.

The abutment members D on the demountable rim 12 are of U-shaped form and are rigidly secured to the rim by means of flush rivets 35, 35. As clearly shown in Fig. 5, the U-shaped members D are arranged transversely of the demountable rim 12 with the arms 36 thereof diverging slightly outwardly toward their free ends and terminating adjacent the outer edge of the rim 12. The connecting portion 37 of the arms 36 of each member D is provided with a flat wedge face 38 adapted to co-act with the wedge face 26 of the co-acting plunger 15. The arms 36 are spaced apart a distance approximating the diameter of the plunger 15 to snugly receive the same, and the inner side faces of the arms are beveled as indicated at 39 to facilitate the entrance of the plungers 15 therebetween, and aid in centering the parts. It will be evident that when the plungers 15 are in their projected position they are in driving engagement with the arms 36 causing the rim 12 and wheel to rotate in unison. In this connection, it will be noted that by providing U-shaped abutment members which have the open portions thereof located at the outer edge of the demountable rim, the abutment members may be readily registered with the plungers 15, thus greatly facilitating the placing of the rim 12 in proper position on the wheel.

The demountable rim illustrated in the drawings is of the "straight-sided" type, but it will be evident that a "clincher," or any other type of rim may be used. The rim 12 is shown as provided with peripheral side flanges 40, the side face of the inner flange of which is adapted to be forced into tight engagement with a peripheral flange 41 on the inner side of the fixed rim 11, by means of the wedging action of the co-acting wedge faces on the plungers 15 and the abutment members D.

The fluid pressure for operating the plungers is admitted to the chambers 25 of the cylinders 14 through the pipes B, connected to the opposite sides of the cylinder heads 18 and communicating with the interior of the cylinders through openings 42 in the heads. As clearly shown in Fig. 1, the pipes B extend from one cylinder to the other, thereby establishing communication between the cylinders. The inflated tire 13 is preferably made use of as the source of fluid pressure supply, the fluid pressure being conveyed from the tire through the medium of the tire valve E and the connection C to the cylinder 14 of the first clamping means A, located immediately to the right of the valve E, as seen in Fig. 1. The cylinder 14 of the last clamping means of the series which is that located to the left of the valve E as viewed in Fig. 1, will have one of the openings 42 thereof closed by a suitable plug to thereby close the end of the pipe line system, the remaining opening 42 being in communication with the pipe B leading to the cylinder 14 of the next adjacent clamping mechanism of the series. It will be evident that, although, I have herein shown the connection C as establishing communication between the tire and the cylinder of the clamping mechanism A to the right of the valve stem E, the same may be arranged so as to establish communication between the cylinder of the mechanism to the left of the valve stem E, or to communicate with both of said mechanisms. It will be evident that in case both of the adjacent cylinders are connected to the valve stem E a check valve will be required in each of said connections to prevent the escape of the air from the cylinders.

The connection C comprises a pipe 43 connected at one end to the cylinder 18 of the clamping mechanism A to the right of the valve stem E and communicating with the interior of the cylinder through the opening 42 next adjacent the valve stem E; a check valve 44 communicating with the other end of the pipe 43, and connected thereto by a union 45; a pipe 46 communicating at one end with the tire valve E and at the other end with the check valve 44 and connected to the latter by a union 49; a union 47; and a cap 48. The cap 48 and the union 47 serve to connect the pipe 46 to the tire valve E; the screw threaded connection between the cap 48 and the valve stem E being air tight.

The check valve 44, as clearly shown in Fig. 6, is of the spring-pressed ball type, comprising a ball 50 co-acting with a valve seat 51, and a spring 52 interposed between the ball 50 and the plug 53 closing the upper end of the check valve. The spring-pressed ball 50 permits the flow of the fluid pressure from the tire to the clamping members, but prevents the flow in the reverse direction, thereby maintaining the pressure in the fluid operated clamping means regardless of the condition of pressure in the tire.

The union 47, as clearly shown in Fig. 6, comprises a fitting 54 having a beveled face engaging with a correspondingly beveled face at the mouth of the valve E, and is held in place by a collar 55 threaded on the reduced lower end of the cap 48. A gasket of rubber, or any other suitable material, may be interposed between the beveled faces to assure an air-tight joint.

The tire valve herein illustrated, is of a well known construction and is, therefore, not shown in detail being an ordinary "Schrader" valve. As is well known, the Schrader type of valve is provided with a valve member proper which permits the air to be forced into the tire but prevents the same from escaping therefrom. The valve member is provided with the usual projecting stem indicated by 56, which, when pressed inwardly, will open the valve proper and permit the air to escape from the tire.

In order to permit the flow of air from the tire to the various fluid operated clamping devices A, means is provided for positively holding the valve stem 56 pressed inwardly a sufficient distance to hold the valve E open. The means for holding the valve stem pressed inwardly, preferably comprises a rod 57 extending axially through the union 47, with its upper end engaging the stem 56 and having its lower end fixed to the lower side wall of the tube at the L-bend 58, as clearly shown in Fig. 6.

In the drawing, the demountable rim is shown as held in fixed position on the wheel by means of the plungers 15, which, under the influence of the fluid pressure are held in tightly wedged relation to the abutment members D, thereby holding the demountable rim 12 tightly clamped to the wheel by the inner flange 40 of the demountable rim being pressed tightly against the flange 41 on the fixed rim 11. When the parts are in this position, the valve proper of the tire valve E is held in open position by the rod 57 engaging the valve stem 56, thereby establishing communication between the interior of the tire and the various cylinders 14, permitting the fluid pressure to flow from the tire to the cylinders and act on the diaphragms 27, thereby forcing the plungers 15 outwardly. In this connection it is pointed out that any reduction of pressure in the tire 13 due to leakage or puncture will in no way affect the clamping action of the plungers 15, the check valve 44 preventing the escape of fluid pressure from the clamping means.

To remove the demountable rim and tire carried thereby from the wheel, the union 45 in the connection C is opened, thereby permitting the escape of the fluid pressure. As the pressure in the chambers 25 of the cylinders 14 is reduced, the springs 30 will simultaneously effect the retraction of the plungers 15. The pipe 46 is then detached by unscrewing union 47, whereupon the demountable rim may be easily removed from the wheel.

In applying the demountable rim and tire carried thereby to the wheel, assuming that the tire has been fully inflated, the tire valve E is inserted through the opening provided therefor in the felly of the wheel and the demountable rim slipped into position in the usual manner, the U-shaped abutment members D being brought into alinement with the plungers 15. The pipe 46 is then put in place and attached first by the union 45 and then union 47. It will be evident that in tightening the union 47 the stem 57 will be moved toward the tire valve E engaging with the valve stem 56 of the tire valve proper pressing the same inwardly, thereby opening the valve and permitting the pressure to escape from the tire and pass through the connection C into the first of the series of cylinders 14, and pass from one cylinder to another through the pipe connections B. The fluid pressure entering the various cylinders will force the plungers 15 outwardly simultaneously, bringing the wedge faces 26 of the outer ends thereof into engagement with the wedge faces 38 of the abutment members B, thereby forcing the demountable rim 12 into tight engagement with the flange 41 of the fixed rim 11.

Should the tire E become deflated to such an extent that it is necessary to refill the same, it may be inflated in the usual manner through the tire valve E, by first removing the pipe section 46 by disconnecting the same at the unions 47 and 49. Disconnecting the pipe section 46 in no way affects the pressure in the clamping system because the check valve 44 effectively prevents the escape of fluid pressure therefrom.

The fluid pressure operated plungers 15 provide a cushioning means in addition to the pneumatic tire, the abutments D being slightly spaced with reference to the outer face of the fixed rim 11 to permit a slight relative movement between the demountable rim 12 and the fixed rim whereby, the plungers 15 are adapted to have a limited movement inwardly of the cylinders 14 resisted by the pressure of the fluid in the chambers 25 of the cylinders.

By my improved arrangement of clamping means, I am able to force air or other fluid directly into the system through the check valve 44 so as to apply the plungers to the demountable rim with a pressure of approximately 180 pounds permitting an air pressure of 80 pounds to be maintained in the tire.

From the preceding description taken in connection with the drawing, it will be evident that I have provided a very simple means for enabling the quick detachment and attachment of the demountable rim of a wheel, the actual time required being only a fraction of that consumed in detaching or attaching a rim secured by the usual clamping lugs.

The attachment of anti skid chains is also greatly facilitated by the use of my improved demountable rim clamping mechanism, in that it is merely necessary to jack up the wheel, disconnect the union 47, and remove the demountable rim together with the tire. The chain may then be applied to the rim and tire while demounted. The rim and tire with the chain attached is then replaced and the union 47 connected.

Although I have herein showed my improved demountable rim clamping mechanism as applied to a wheel having a wooden felly, it will be evident that the same is not limited to use with any particular type of wheel or felly. When the mechanism is applied to a wheel having a steel U-shaped felly instead of the wooden felly herein shown, all the connections B and the clamping devices A will be used within the felly thereby better protecting the same from the weather and from other sources of damage.

I have herein shown and described what I now consider the preferred manner of carrying out the invention, but the same is merely illustrative and I contemplate all changes and modifications that come within the scope of the claims appended hereto.

I claim:—

1. The combination with a wheel and a demountable tire carrying rim; of a plurality of circumferentially spaced, rim clamping devices, fluid pressure-actuated mechanism for operating each of said devices; a source of fluid under pressure; and means for establishing communication between said source and all of said fluid pressure-actuating mechanisms.

2. The combination with a wheel; of a demountable rim carrying a pneumatic tire; circumferentially spaced elements for clamping the rim to the wheel, fluid pressure-operated means for operating said elements, said elements and means being permanently mounted on the wheel; and means for communicating the fluid pressure of said tire to said clamping fluid pressure operated means for operating the latter.

3. In a clamping means for a demountable rim for a wheel, the combination with a plurality of circumferentially spaced fluid pressure actuated clamping devices permanently mounted on said wheel; of means for establishing fluid communication between said devices.

4. In a mechanism of the character described, the combination with a wheel; of a rim; means for detachably clamping the rim to the wheel, said means including a plurality of slidable plungers, radially disposed on said wheel; and fluid pressure-operated means for operating said plungers.

5. In a mechanism of the character described, the combination with a wheel; of a rim; means for detachably clamping the rim to the wheel, said means including a plurality of spring retracted slidable plungers, said plungers being radially disposed with reference to said wheel; and fluid pressure operated means for projecting said plungers.

6. In a fluid pressure operated rim clamping means, the combination with a cylinder; of a spring retracted clamping plunger mounted in the cylinder; means for admitting fluid pressure to said cylinder to force the plunger into projected position; and means for effecting withdrawal of the fluid pressure to cause said plunger to be retracted.

7. In a fluid pressure operated rim clamping means, the combination with a cylinder; of a spring retracted clamping plunger working in said cylinder; a diaphragm within the cylinder and co-acting with the plunger; and means for subjecting the diaphragm to fluid pressure to project the plunger.

8. The combination with a wheel and a demountable rim carrying an inflatable tire; of a fluid pressure operated means for holding the rim in fixed position on the wheel; means for establishing communication between the fluid pressure operated means and the interior of said tire, said means for establishing communication including a device for holding the tire valve open.

9. The combination with a wheel, and a demountable rim carrying an inflatable tire; of a fluid pressure operated means for holding the rim in fixed position on the wheel; means for establishing communication between the fluid pressure operated means and the interior of said tire, said means for establishing communication including a check valve operative to permit the flow of the pressure from the tire to the fluid pressure operated means and preventing the flow in the reverse direction.

10. The combination with a wheel, and a demountable rim carrying an inflatable tire; of a fluid pressure operated means for holding the rim in fixed position on the wheel; means for establishing communication between the fluid pressure operated means and the interior of said tire, said means for establishing communication including devices for reducing the pressure in said fluid pressure operated means.

11. The combination with a wheel and a demountable rim carrying an inflatable tire; of a plurality of fluid pressure operated clamping devices for holding the rim in fixed position on the wheel; and means for simultaneously establishing communication between said devices and the interior of the tire, said means including a removable connection adapted to be secured to the tire valve.

12. The combination with a wheel and a demountable rim carrying an inflatable tire; of a plurality of fluid pressure operated clamping devices for holding the rim in fixed position on the wheel; and means for establishing communication between said devices and the interior of the tire, said means including a removable connection adapted to be secured to the tire valve, said connection being provided with a device for operating the tire valve to open the same when the connection is secured in operative position.

13. The combination with a wheel, and a demountable rim carrying an inflatable tire; of a plurality of fluid pressure operated clamping devices for holding the rim in fixed position on the wheel; and means for establishing communication between the said devices and the interior of the tire, said means including a check valve and a removable connection, said connection being adapted to establish communication between the tire valve and check valve.

14. The combination with a wheel and a demountable rim carrying an inflatable tire; of a plurality of fluid pressure-operated clamping devices for holding the rim in fixed position on the wheel; and means for establishing communication between said devices and the interior of the tire, said means including a check valve adapted to maintain the fluid pressure in said devices, and means between check valve and said devices for relieving the pressure.

15. The combination with a wheel; of a demountable rim; of a series of clamping devices mounted on the wheel; a plurality of fluid pressure actuated means for operating said devices; means for establishing communication between the different fluid pressure actuated operating means; and means for establishing communication between one of said operating means and a source of fluid pressure.

16. In a clamping means for demountable rims for wheels, the combination with a plurality of circumferentially spaced inherently compensatory pressure-equalizing clamping devices permanently attached to a wheel; of means for operating all of said devices simultaneously to clamp the rim in place.

17. In a clamping means for a demountable rim for a wheel, the combination with a plurality of radially disposed clamping devices, carried by the wheel independently of the rim automatically adjustable relatively to each other; of inherently compensatory means for simultaneously operating all of said devices, whereby an equal distribution of the clamping pressure of said devices on the rim is obtained.

In witness that I claim the foregoing I have hereunto subscribed my name this 29th day of March, 1923.

HARLEY E. ANDERSON.